(12) United States Patent
Rodriguez et al.

(10) Patent No.: US 11,095,868 B1
(45) Date of Patent: Aug. 17, 2021

(54) VISION SYSTEMS AND METHODS OF MAKING AND USING THE SAME

(71) Applicant: Cognex Corporation, Natick, MA (US)

(72) Inventors: Saul Sanz Rodriguez, Aachen (DE); Laurens Nunnink, Simpelveld (NL)

(73) Assignee: COGNEX CORPORATION, Natick, MA (US)

( * ) Notice: Subject to any disclaimer, the term of this patent is extended or adjusted under 35 U.S.C. 154(b) by 218 days.

(21) Appl. No.: 15/200,563

(22) Filed: Jul. 1, 2016

(51) Int. Cl.
  *H04N 13/218* (2018.01)
  *H04N 13/254* (2018.01)
  *G02B 30/35* (2020.01)
  *H04N 13/257* (2018.01)
  *H04N 13/296* (2018.01)

(52) U.S. Cl.
  CPC ........... *H04N 13/218* (2018.05); *G02B 30/35* (2020.01); *H04N 13/254* (2018.05); *H04N 13/257* (2018.05); *H04N 13/296* (2018.05)

(58) Field of Classification Search
  CPC .... G01B 11/24; H04N 13/218; H04N 13/296; H04N 13/254; H04N 13/257; G02B 30/35
  USPC ..................................... 348/42–60, 135–141
  See application file for complete search history.

(56) References Cited

U.S. PATENT DOCUMENTS

| | | | |
|---|---|---|---|
| 5,359,185 A | 10/1994 | Hanson | |
| 6,028,672 A * | 2/2000 | Geng | G01B 11/022 250/237 G |
| 6,268,918 B1 * | 7/2001 | Tanabe | G01B 11/25 348/E5.029 |
| 6,542,249 B1 * | 4/2003 | Kofman | G01B 11/2513 356/601 |
| 6,832,725 B2 | 12/2004 | Gardiner et al. | |
| 7,025,271 B2 | 4/2006 | Dvorkis et al. | |
| 7,028,901 B2 | 4/2006 | Carlson | |
| 7,843,574 B2 * | 11/2010 | Schmitt | G01B 11/2509 356/611 |
| 8,061,610 B2 | 11/2011 | Nunnink | |
| 9,488,469 B1 * | 11/2016 | Michael | G01B 11/25 |
| 2003/0072569 A1 * | 4/2003 | Seo | G03B 35/10 396/331 |
| 2006/0079816 A1 | 4/2006 | Barthe et al. | |
| 2007/0131770 A1 | 6/2007 | Nunnink | |
| 2011/0249121 A1 * | 10/2011 | Taillade | G01V 8/14 348/153 |
| 2016/0150214 A1 * | 5/2016 | Hosea | G03B 35/10 348/49 |
| 2016/0286124 A1 * | 9/2016 | Xu | G02B 13/06 |
| 2017/0026570 A1 * | 1/2017 | Shepard | H04N 5/2254 |
| 2017/0214861 A1 * | 7/2017 | Rachlin | G03B 5/00 |

\* cited by examiner

*Primary Examiner* — Tung T Vo
(74) *Attorney, Agent, or Firm* — Quarles & Brady LLP

(57) ABSTRACT

Vision systems and methods for acquiring an image of an image scene and/or measuring a three-dimensional location of an object are disclosed. The vision systems can include a single image sensor, a first optical path, and a second optical path. The first optical path can be selectively transmissive of a first light, the second optical path can be selectively transmissive of a second light, and the first and second light can have a different distinguishing characteristic.

20 Claims, 12 Drawing Sheets

VISION SYSTEMS AND METHODS OF MAKING AND USING THE SAME

CROSS-REFERENCE TO RELATED APPLICATIONS

N/A

BACKGROUND

The present technology relates to vision systems, and more specifically, to vision systems capable of acquiring images of multiple fields of view and/or image scenes using a single image sensor.

The typical technical solution for acquiring multiple images of an image scene with differing fields of view and/or focal planes is to deploy multiple whole cameras. However, individual cameras each require at least an image sensor, and in most cases, individual cameras each require a dedicated processor. Accordingly, the cost associated with acquiring the images with differing fields of view and/or focal planes can be significant.

Therefore, what is needed is a vision system that can acquire images with varying fields of view and/or focal planes in a timely fashion, without incurring the added cost of additional image sensors or processors.

BRIEF SUMMARY

The present disclosure overcomes the aforementioned problems by providing a vision system and methods of making and using the same.

In an aspect, a vision system can include a first image sensor, a first optical path, a second optical path, one or more illuminators, and a processor. The first optical path can include a first field of view and a first focal plane. The first optical path can project a first image scene from the first field of view onto the first image sensor. The second optical path can include a second field of view and a second focal plane. The second optical path can project a second image scene from the second field of view onto the first image sensor. The one or more illuminators can be configured to selectively illuminate at least a portion of the first field of view with a first light and at least a portion of the second field of view with a second light. The processor can be electronically coupled to the first image sensor. The processor can be configured to receive and process image data from the first image sensor. The processor can be electronically coupled to the one or more illuminators. The processor can be configured to control the one or more illuminators. The first light can have a first distinguishing characteristic that is different than a second distinguishing characteristic of the second light. The first optical path can selectively transmit the first light over the second light. The second optical path can selectively transmit the second light over the first light.

The first field of view can be different than the second field of view, the first focal plane can be different than the second focal plane, or a combination thereof. The first field of view can be different than the second field of view. The first focal plane can be the same as the second focal plane. The first focal plane can be different than the second focal plane. The first field of view can be narrower or wider than the second field of view. The first optical path can include a first aperture. The second optical path can include a second aperture. The first aperture and the second aperture can have a different size and/or shape. The first and second distinguishing characteristics can be wavelength, polarization, or a combination thereof. The first light can have a first wavelength and the second light can have a second wavelength. The first wavelength can be greater than a pre-defined differentiating wavelength. The second wavelength can be less than the pre-defined differentiating wavelength. The first optical path or the second optical path can include a selective reflector that selectively reflects the first light over the second light or the second light over the first light. The vision system can include a first filter positioned in the first optical path and/or a second filter positioned in the second optical path. The first filter can be configured to selectively transmit the first light over the second light or to block the second light. The second filter can be configured to selectively transmit the second light over the first light or to block the first light. The first optical path can include a first optical axis that is normal to the first image sensor. The second optical path can include a second optical axis that is parallel to the first optical axis. The first optical path can have a first co-axial portion adjacent to the first image sensor and a first distal portion distal from the first image sensor. The second optical path can have a second co-axial portion adjacent to the first image sensor and a second distal portion distal from the first image sensor. The first co-axial portion and the second co-axial portion can be co-axial. The first distal portion and the second distal portion can be not co-axial. The selective reflector can be configured to receive the second light from the second distal portion and to reflect the second light to the second co-axial portion. The selective reflector can be configured to receive the first light from the first distal portion. The selective reflector can be positioned between the first distal portion and the first co-axial portion. The selective reflector can be configured to reflect the second light from the first distal portion away from the first co-axial portion. The selective reflector can be configured to transmit the first light. The vision system can further include a handheld housing. The handheld housing can contain the first image sensor, a portion of the first optical path, a portion of the second optical path, and the one or more illuminators. The first image sensor can be a color image sensor. The processor and the color image sensor can be configured to simultaneously acquire images of the first image scene and the second image scene. The color image sensor can include a plurality of pixels that each of two or more sub-pixels. A first sub-pixel of the two or more sub-pixels can be sensitive to the first light. A second sub-pixel of the two or more sub-pixels can be sensitive to the second light.

The vision system can further include a third optical path. The third optical path can have a third field of view and a third focal plane. The third optical path can project a third image scene from the third field of view onto the first image sensor. The one or more illuminators can be configured to selectively illuminate at least a portion of the third field of view with a third light. The third light can have at least one third distinguishing characteristic that is different than the first and second distinguishing characteristics. The first optical path can selectively transmit the first light over the third light. The second optical path can selectively transmit the second light over the third light. The third optical path can selectively transmit the third light over the first light and the second light. The third field of view can be different than the first field of view and the second field of view, the third focal plane can be different than the first focal plane and the second focal plane, the third field of view is different than the first field of view and the third focal plane is different than the second focal plane, the third field of view is different than the second field of view and the third focal plane is different than the first focal plane, or a combination thereof.

In another aspect, a method of acquiring one or more images of an image scene can include one or more of the following steps: a) illuminating at least a portion of a first field of view of a first optical path with a first light, the first field of view overlapping at least partially with the image scene, the first optical path projects the first field of view onto a first image sensor, the first optical path is selectively transmissive of the first light over a second light; b) acquiring, using the first image sensor and a processor, a first image using a first reflected light from the illuminating of step a); c) illuminating at least a portion of a second field of view of a second optical path with the second light, the second field of view overlapping at least partially with the image scene, the second optical path projects the second field of view onto the first image sensor, the second optical path is selectively transmissive of the second light over the first light; and d) acquiring, using the first image sensor and the processor, a second image using a second reflected light from the illuminating of step c).

The method can further include: e) combining, using the processor, the first image and the second image to form a single image including at least a portion of the image scene. The illuminating of step a) and the illuminating of step c) can not overlap in time. The illuminating of step a) and the illuminating of step c) can be separated by between 1 μs and 1 s. The illuminating of step a), the illuminating of step c), or both can include flashes of light having a pulse length of between 1 μs and 1 s. The method can further include filtering the first optical path to block the second light. The method can further include filtering the second optical path to block the first light.

In a further aspect, a vision system can include a first image sensor, a first optical path, a second optical path, a selective reflector, a second reflector, one or more illuminators, and a processor. The first image sensor can have a camera optical axis that emerges from the center of the first image sensor at a normal angle to the first image sensor. The first optical path can have a first lens that defines a first field of view and a first focal plane. The first optical path can have a first optical axis that is co-axial with the camera optical axis. The second optical path can have a second lens that defines a second field of view and a second focal plane. The second optical path can have a second optical axis. At least a portion of the second optical axis can be not co-axial with the camera optical axis. The selective reflector can be positioned along the camera optical axis and located between the first image sensor and the first lens. The selective reflector can selectively reflect a second light over a first light. The second reflector can be positioned along the second optical path. The second reflector and the selective reflector can be configured to direct the second light from the second field of view to the first image sensor. The one or more illuminators can be configured to selectively illuminate at least a portion of the first field of view with the first light and/or at least a portion of the second field of view with the second light. The processor can be electronically coupled to the first image sensor and configured to receive and process image data from the first image sensor. The processor can be electronically coupled to the one or more illuminators and configured to control the one or more illuminators. The first field of view can be different than the second field of view, the first focal plane can be different than the second focal plane, or a combination thereof. The first light can have a first distinguishing characteristic that is different than a second distinguishing characteristic of the second light. The selective reflector can be configured to receive the second light from the second distal portion and to reflect the second light to the second co-axial portion. The selective reflector can be configured to receive the first light from the first distal portion. The selective reflector can be positioned between the first distal portion and the first co-axial portion. The selective reflector can be configured to reflect the second light from the first distal portion away from the first co-axial portion. The selective reflector can be configured to transmit the first light over the second light. The vision system can include a handheld housing containing the first image sensor, a portion of the first optical path, a portion of the second optical path, the first lens, the second lens, the selective reflector, the second reflector, and the one or more illuminators.

The first field of view can be different than the second field of view. The first focal plane can be the same as the second focal plane. The first focal plane can be different than the second focal plane. The first field of view can be wider or narrower than the second field of view. The first and second distinguishing characteristics can be wavelength, polarization, or a combination thereof. The first light can have a first wavelength and the second light can have a second wavelength. The first wavelength can be greater than a pre-defined differentiating wavelength. The second wavelength can be less than the pre-defined differentiating wavelength. The vision system can include a first filter positioned in the first optical path and/or a second filter positioned in the second optical path. The first filter can be configured to selectively transmit the first light over the second light or to block the second light. The second filter can be configured to selectively transmit the second light over the first light or to block the first light. A distal portion of the second optical axis can be parallel to the first optical axis. The first optical path can have a first co-axial portion adjacent to the first image sensor and a first distal portion distal from the first image sensor. The second optical path can have a second co-axial portion adjacent to the first image sensor and a second distal portion distal from the first image sensor. The first co-axial portion and the second co-axial portion can be co-axial. The first distal portion and the second distal portion can be not co-axial. The first image sensor can be a color image sensor. The processor and the color image sensor can be configured to simultaneously acquire images of the first image scene and the second image scene. The color image sensor can include a plurality of pixels that each of two or more sub-pixels. A first sub-pixel of the two or more sub-pixels can be sensitive to the first light. A second sub-pixel of the two or more sub-pixels can be sensitive to the second light.

In yet another aspect, a method of measuring a position of an object in a three-dimensional space defined by an overlap of a first field of view and a second field of view, the method utilizing a camera system comprising a first image sensor, a first optical path, a second optical path, one or more illuminators, and a processor, the first image sensor defining a z-direction that is normal to the first image sensor, a y-direction that lies in a plane of the first image sensor, and an x-direction that lies in the plane of the first image sensor at a 90° angle relative to the y-direction, the first optical path having the first field of view, the second optical path having the second field of view, the method can include one or more of the following steps: a) illuminating, using the one or more illuminators, at least a portion of the first field of view with a first light, the first optical path is selectively transmissive of the first light over a second light; b) acquiring, using the first image sensor and the processor, a first image of at least a portion of the three-dimensional space using a first reflected light from the illuminating of step a); c) illuminating, using the one or more illuminators, at least a portion of the second field of view with the second light, the second optical path is selectively transmissive of the second light over the first light; d) acquiring, using the first image sensor and the processor, a second image of at least at portion of the three-dimensional space using a second reflected light from the illuminating of step c); e) locating the object in the first image and the second image; and f) calculating, using one or more geometric functions executed by the processor, the location of the object in the first image, the location of the object in the second image, the focal length of the first optical path, the focal length of the second optical path, and an offset distance between the first optical path and the second optical path in the y-direction, the location of the object in the three-dimensional space. The geometric functions can include:

$$X = \frac{(f2 - f1 - d) \cdot px1 \cdot px2}{f1 \cdot px2 - f2 \cdot px1};$$

$$Y = \frac{(f2 - f1 - d) \cdot py1 \cdot px2}{f1 \cdot px2 - f2 \cdot px1};$$

and $$Z = f1 \cdot \left(\frac{f2 \cdot (px2 - px1) - d \cdot px2}{f1 \cdot px2 - f2 \cdot px1}\right),$$

wherein px1 is an x-component of the location of the object in the first image relative to a center point of the first image sensor, py1 is a y-component of the location of the object in the first image relative to the center point of the first image sensor, px2 is an x-component of the location of the object in the second image relative to the center point of the first image sensor, f1 is the focal length of the first optical path, f2 is the focal length of the second optical path, d is the offset distance between the first optical path and the second optical path, Z is a distance of the object relative to the center of the first image sensor in the z-direction, Y is a distance of the object relative to the center of the first image sensor in the y-direction, and X is a distance of the object relative to the center of the first image sensor in the x-direction.

To the accomplishment of the foregoing and related ends, the embodiments, then, comprise the features hereinafter fully described. The following description and annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
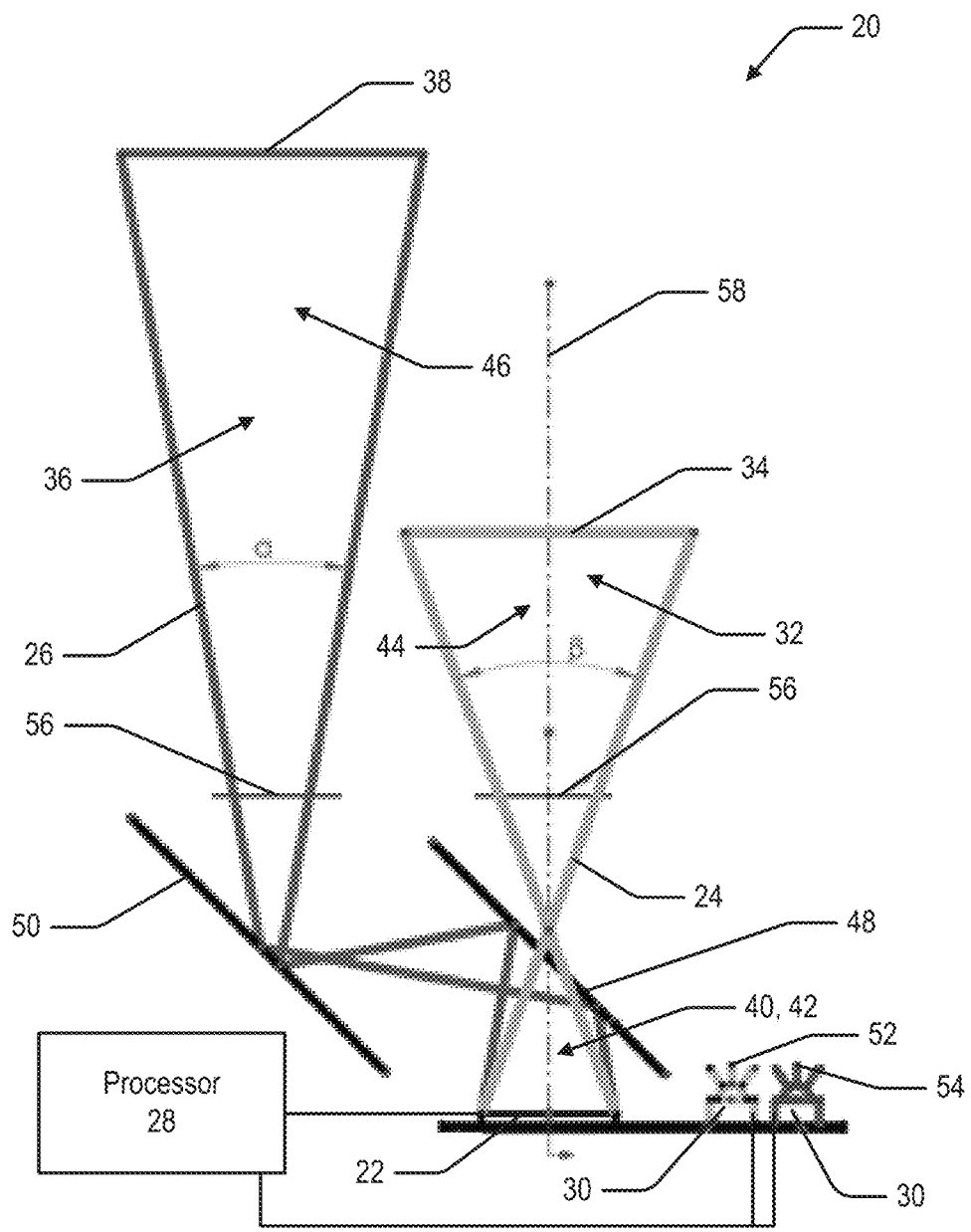
FIG. 1 is a cross-section view of a vision system having two non-overlapping fields of view and different focal planes, in accordance with the present disclosure.

While the technology is susceptible to various modifications and alternative forms, specific aspects thereof have been shown by way of example in the drawings and are herein described in detail. It should be understood, however, that the description herein of specific aspects is not intended to limit the technology to the particular forms disclosed, but on the contrary, the intention is to cover all modifications, equivalents, and alternatives falling within the spirit and scope of the technology as defined by the appended claims.

DETAILED DESCRIPTION

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

Variations of the terms "comprising", "including", or "having" should be interpreted as referring to elements, components, or steps in a non-exclusive manner, so the referenced elements, components, or steps may be combined with other elements, components, or steps that are not expressly referenced. Aspects referenced as "comprising", "including", or "having" certain elements, components, or steps are also contemplated as "consisting essentially of" and "consisting of" those elements, components, or steps.

Numerical ranges used herein are inclusive of the end values (i.e., a number between 1 and 10 includes the values 1 and 10 and all values that lie between).

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to control an electronic based device to implement aspects detailed herein.

Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which programs may be stored and/or data communications may be buffered. The term "memory" may also include other types of memory or combinations thereof.

A "distinguishing characteristic of light" as used in this disclosure refers to a property of light that can be used to separate light into two or more parts or that can be used to combine light from two or more parts into one part. Examples of distinguishing characteristics of light include, but are not limited to, wavelength, bandwidth, polarization, phase, and pulse repetition rate, among others.

A "field of view" as used herein shall refer to a three-dimensional space in which an object, that has no obstructions between the object and the image sensor, is visible at the image sensor.

A "two-dimensional field of view" as used herein shall refer to a projection of the field of view onto the image sensor. The two-dimensional field of view can be limited by two factors: 1) the size of the image sensor—if light is projected around the image sensor, that light is outside the two-dimensional field of view; and 2) any apertures located between the image scene and the image sensor—if no light is projected onto pixels at the periphery of the image sensor, then those pixels are outside the two-dimensional field of view.

A "focal plane" as used herein shall refer to a plane that is perpendicular to an optical axis and which is positioned at the focus of the camera along the optical axis.

A "lens" as used herein shall refer to an optic or multiple optics that perform the function of a lens. Examples of lenses include, but are not limited to, lenses, lens objectives, curved mirror pairs, and the like.

A "selective reflector" or the term "selectively reflects/selective reflection" as used herein shall refer to an optical element that reflects at least 50%, at least 75%, at least 80%, at least 85%, at least 90%, at least 95%, at least 99%, or at least 99.9% of a first light having a first distinguishing characteristic and that transmits at least 50%, at least 75%, at least 80%, at least 85%, at least 90%, at least 95%, at least 99%, or at least 99.9% of a second light having a second distinguishing characteristic. In some cases, the portion of the second light that is not transmitted is itself reflected. Examples of a selective reflector include, but are not limited to, a wavelength-specific dielectric mirror and a polarizing beamsplitter, among others.

The term "selectively transmits/selective transmission" as used herein shall refer to an optical path or element that transmits at least 50%, at least 75%, at least 80%, at least 85%, at least 90%, at least 95%, at least 99%, or at least 99.9% of a first light having a first distinguishing characteristic and that prevents transmission of at least 50%, at least 75%, at least 80%, at least 85%, at least 90%, at least 95%, at least 99%, or at least 99.9% of a second light having a second distinguishing characteristic.

The term "up to nth" as used herein shall refer to any integer number of the entity that the phrase is modifying. The term "up to nth" is not intended to be limiting, and is used for the sake of brevity. The only limitation intended for the term "up to nth" are practical limitations that will be apparent for a person having ordinary skill in the art. It should be appreciated that practical limitations change over the course of time and the term "up to nth" explicitly contemplates integer numbers that become practical over time given technological advancements.

The term "illuminator" as used herein refers to any lighting arrangement that is configured to project light onto an area or volume that makes up part of a field of view of a system as described herein.

The term "light" as used herein refers to electromagnetic radiation that is capable of being produced by an illuminator and capable of being sensed by an image sensor.

Vision System

Referring to FIGS. 1-6, this disclosure provides a vision system 20. The vision system 20 can include an image sensor 22, a first optical path 24, and a second optical path 26. The vision system 20 can include a processor 28 (not illustrated in FIGS. 3-6, but can be present in any of the vision systems 20 illustrated) electronically coupled to the image sensor 22. In certain aspects, the vision system 20 can include one or more illuminators 30 (not illustrated in FIGS. 3-6, but can be present in any of the vision systems 20 illustrated).

The image sensor 22 can be an image sensor known to those having ordinary skill in the art. Examples of suitable image sensors include, but are not limited to, a complementary metal-oxide-semiconductor (CMOS) camera sensor, a charge-coupled device (CCD) sensor, an N-type metaloxide-semiconductor (NMOS) camera sensor, and the like. The image sensor 22 can be used to define the space relative to the vision system 20 in the following way: a z-direction can be defined as the direction normal to the image sensor 22, an x-direction and a y-direction can be defined as planar with the image sensor 22 and orthogonal to one another (and definitionally, the z-direction). In the illustrated aspects of the present embodiments, when two optical paths are offset relative to one another, those paths are offset in the y-direction, though the coordinate systems can be defined in a variety of ways that should be apparent to those having ordinary skill in the art.

In certain aspects, the image sensor 22 can be a color image sensor. The color image sensor can be used to acquire an image in a variety of ways as follows: 1) the color image sensor can be used to acquire an image all of the colors that can be sensed by the color image sensor at the same time; 2) the color image sensor can be used in the fashion described in 1) and the processor 28 can be used to filter or parse out individual colors from the image; 3) the color image sensor can have selectable sub-pixels, such as RGB sub-pixels, and the color image sensor can be used to acquire an image with only one set of selectable sub-pixels active; and 4) the color image sensor can be utilized in other ways apparent to a person having ordinary skill in the art. As an example of scheme 3), a color image sensor having pixels that each have RGB sub-pixels can acquire an image with only the red-sensitive sub-pixels active (or green-sensitive or blue-sensitive, as appropriate), and thus acquire an image capturing only the red (or green or blue) colors. In some aspects, the color image sensor can be sensitive to wavelengths outside the visible range. In certain aspects, the color image sensor allows the vision system 20 to acquire images of multiple optical paths simultaneously. As used herein, the term "simultaneous" refers to some overlap in time, including partial overlap in time and complete overlap in time.

The first optical path 24 can have a first field of view 32 and a first focal plane 34. The second optical path 26 can have a second field of view 36 and a second focal plane 38. The first optical path 24 can have a first co-axial portion 40 and the second optical path 26 can have a second co-axial portion 42 where the two optical paths 24, 26 are co-axial with one another. The first and second co-axial portions 40, 42 can be adjacent to the image sensor. The first optical path 24 can have a first distal portion 44. The second optical path 26 can have a second distal portion 46. The first and second distal portions 44, 46 can be distal to the image sensor 22, relative to the co-axial portion 40.

The vision system 20 can have a camera optical axis 58, which lies along the z-direction relative to the image sensor 22. In certain aspects, the first optical path 24 lies along the camera optical axis 58. Having one optical path lie along the camera optical axis 58 can have cost benefits because fewer optics may be required.

Figure 2:
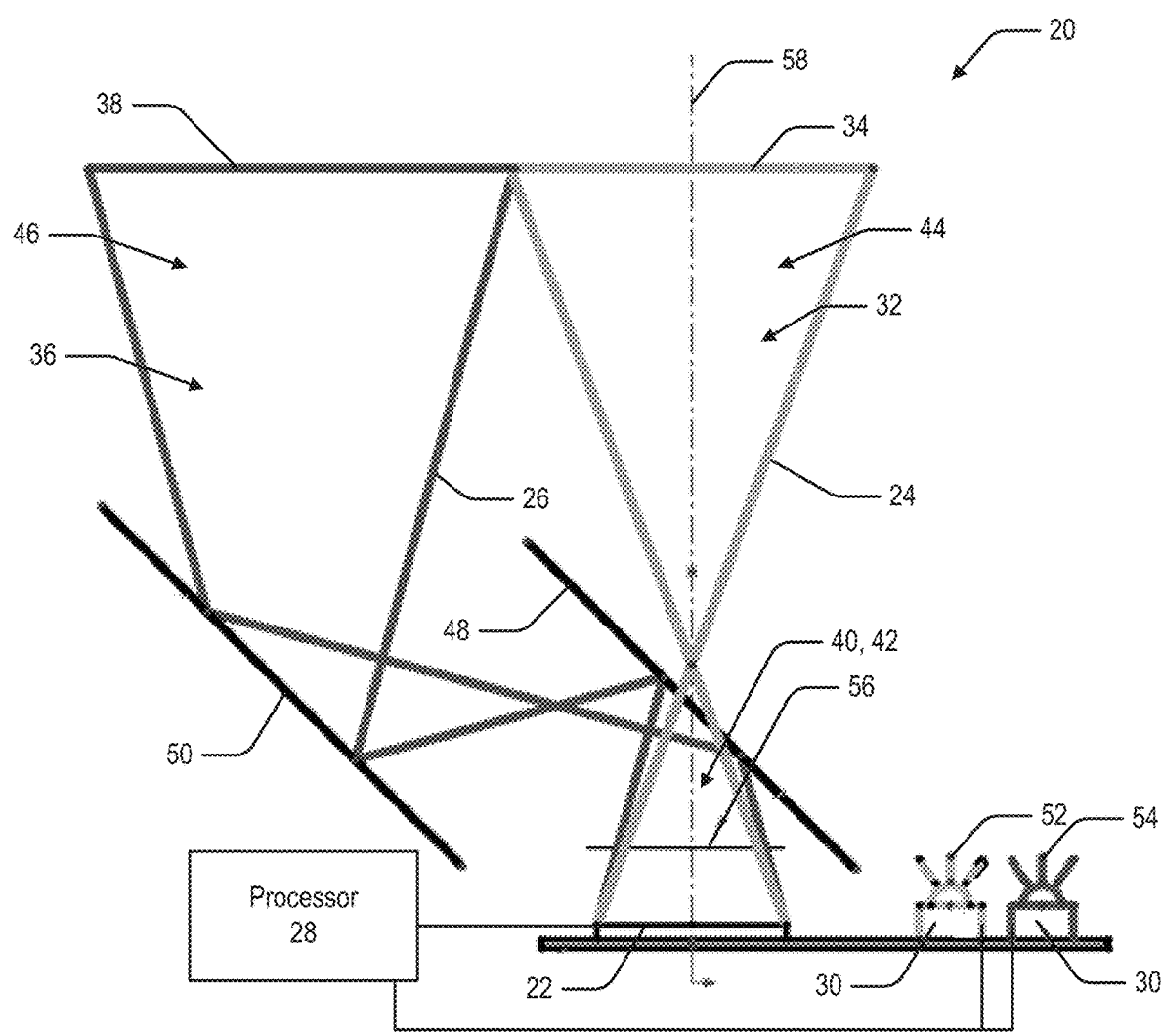
FIG. 2 is a cross-section view of a vision system having two non-overlapping fields of view and the same focal plane, in accordance with the present disclosure.

In certain aspects, the first field of view 32 and the second field of view 36 can have no overlap between them, as illustrated in FIGS. 1 and 2. The arrangement with no overlap can be utilized to expand the overall field of view of the vision system 20 to the greatest extent. This expansion of the overall field of view can have performance and cost advantages. For example, a vision system 20 configured to acquire images of two non-overlapping fields of view can improve the speed efficiency when compared to traditional systems that may require adjustment of optics to acquire different fields of view. As another example, a vision system 20 configured to acquire images of two non-overlapping fields of view can afford the acquisition of images of those two fields of view without a substantial time delay between images, as would typically be required by a traditional system.

Figure 3:
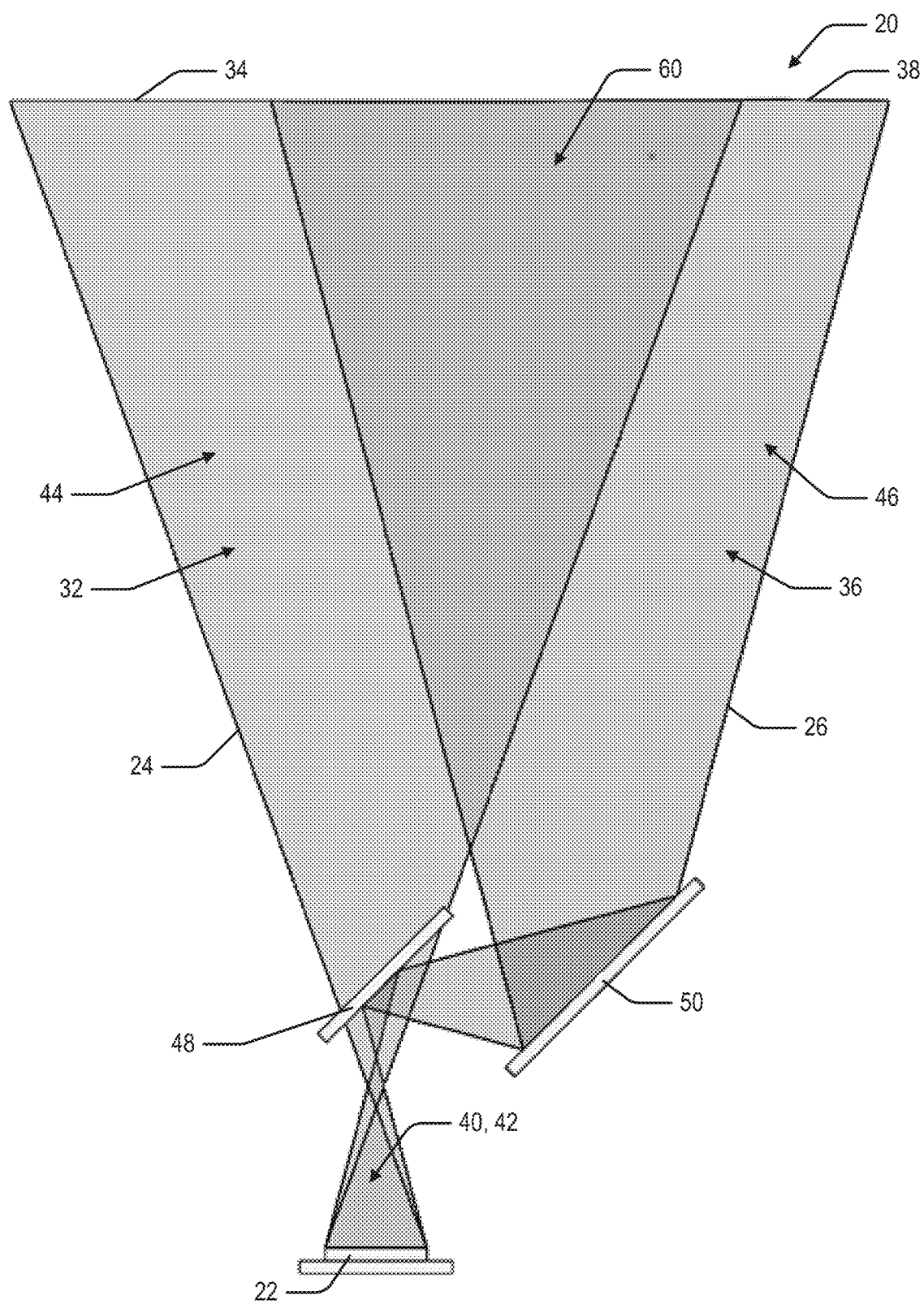
FIG. 3 is a cross-section view of a vision system having two overlapping fields of view and the same focal plane, in accordance with the present disclosure.
Figure 4:
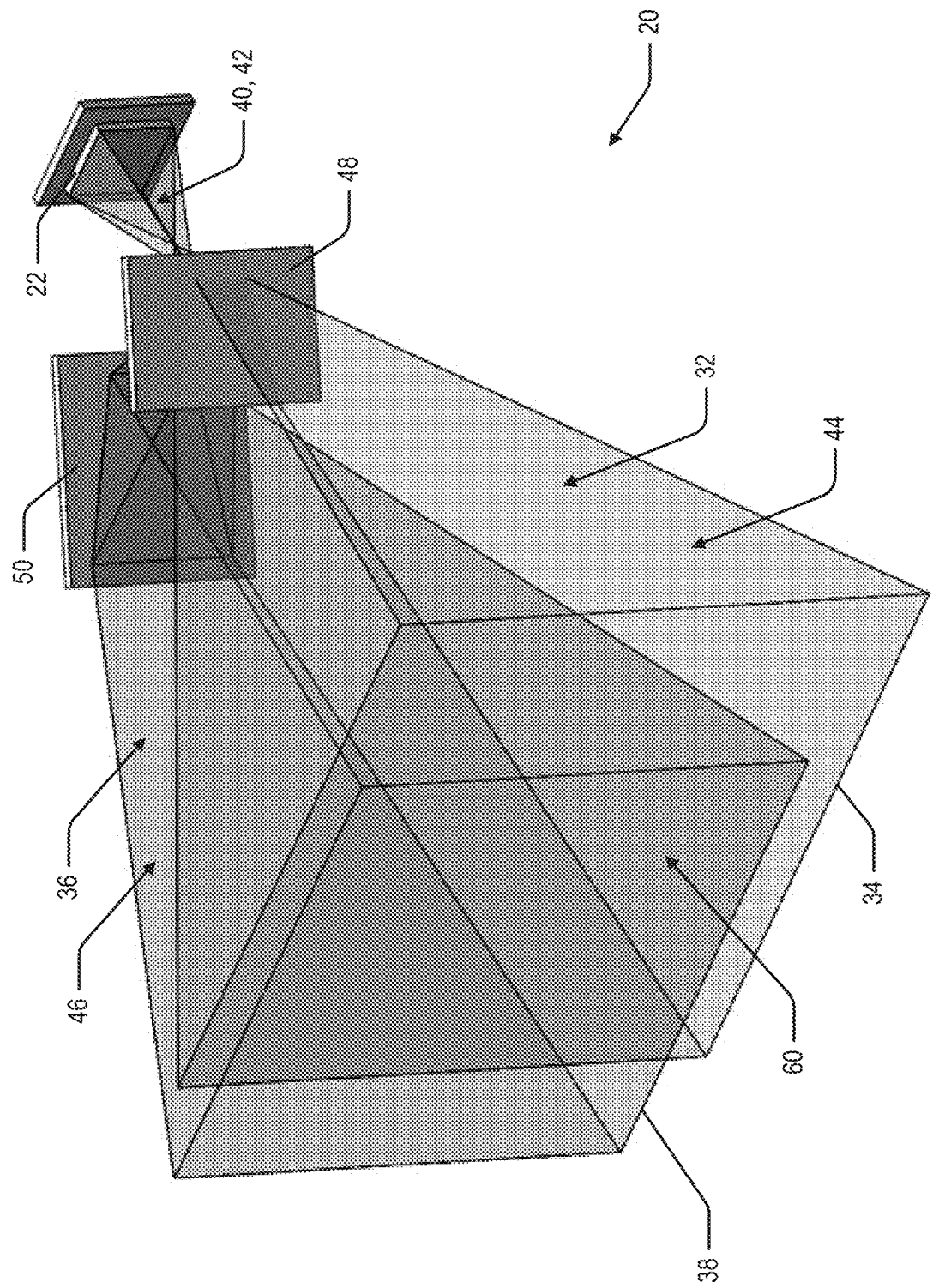
FIG. 4 is a perspective view of a vision system having two overlapping fields of view and the same focal plane, in accordance with the present disclosure.
Figure 5:
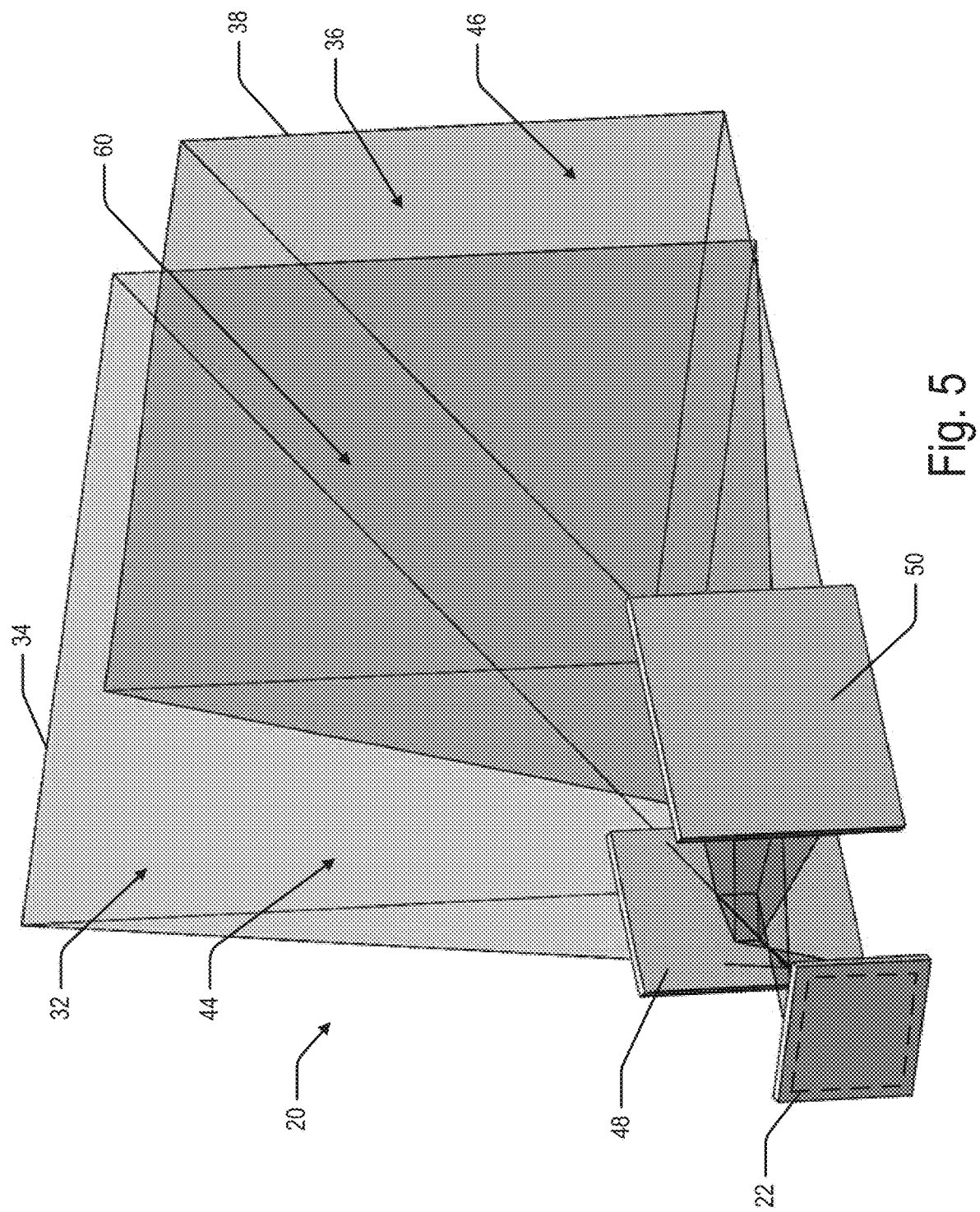
FIG. 5 is a perspective view of a vision system having two overlapping fields of view and the same focal plane, in accordance with the present disclosure.

In certain aspects, the first field of view 32 and the second field of view 36 can have an overlapping field of view 60, as illustrated in FIGS. 3-5. The arrangement with an overlapping field of view 60 can be used to determine the location of an object within the overlapping field of view 60, as described below.

In certain aspects, the first focal plane 34 and the second focal plane 38 can be the same, as illustrated in FIGS. 2-6, or different, as illustrated in FIG. 1. In cases where the focal planes are different, the vision system 20 can be utilized to extend the depth of field compared to a traditional system. This feature can be useful when using the vision system 20 to acquire images of objects that are known to be at different distances from the vision system 20. For example, if the vision system 20 is being used to acquire images of objects moving down a conveyor belt, and if the objects are known to be either flat envelopes or boxes having a known height, the vision system 20 having a first focal plane 34 configured to provide focused images at the height of the envelope (i.e., focused just above the conveyor belt) and a second focal plane 38 configured to provide focused images at the known height of the boxes (or vice versa) can afford enhanced image acquisition speed. Using a traditional system, the focus of a camera would need to be changed and/or continually scanned to cover the varying height of the objects.

Figure 6:
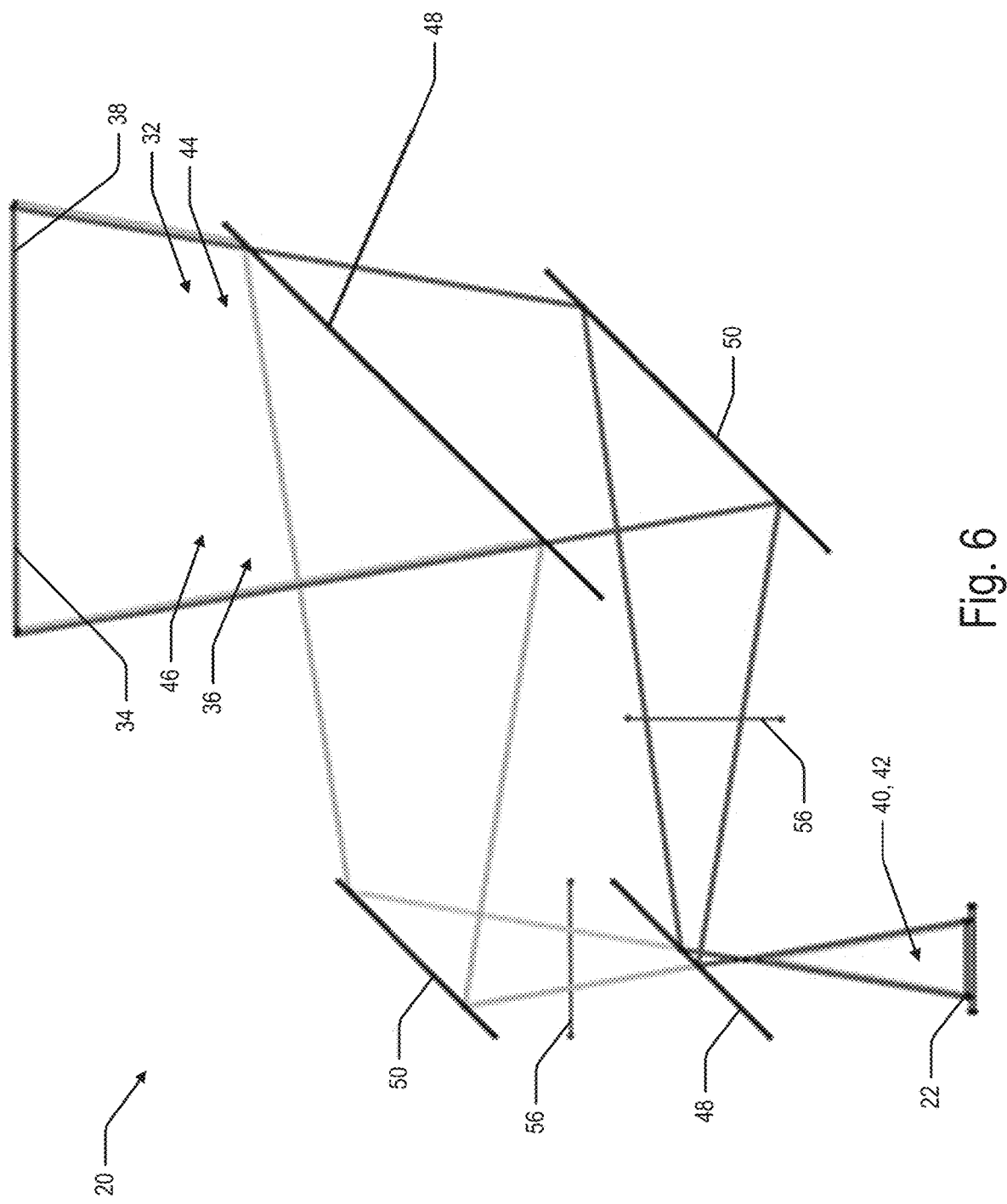
FIG. 6 is a cross-section view of a vision system having two optical paths with the same field of view and the same focal plane, in accordance with the present disclosure.

In certain aspects, the first focal plane 34 and the second focal plane 38 can be the same and the first field of view 32 and the second field of view 36 can also be the same, as illustrated in FIG. 6. It should be appreciated that the aspects illustrated in FIGS. 1-6 are not intended to limit the scope of the present disclosure, and any combination of the various aspects is possible, including but not limited to, the same or different focal planes, the same or different fields of view, various similarities or differences in aperture sizes or shape, and the like.

The vision system 20 can include a selective reflector 48 positioned along the first optical path 24 and the second optical path 26. The selective reflector 48 can be configured to selectively transmit and/or transmit light from the first optical path 24 and selectively reflect and/or transmit light from the second optical path 26. The selective transmission and reflection can be based on different distinguishing characteristics of light. The selective reflector 48 can be a dielectric mirror, which selectively reflects/transmits light of a certain wavelength, a polarizing beamsplitter, which selectively reflects/transmits light of a certain polarization, and the like. The vision system 20 can include multiple selective reflectors 48, as illustrated in FIG. 6.

The second optical path 26 can include a second reflector 50 that either selectively or non-selectively can reflect light from the second optical path 26. In certain aspects, the selective reflector 48 and the second reflector 50 can be parallel to one another. The vision system 20 can include multiple second reflectors 50, as illustrated in FIG. 6.

The one or more illuminators 30 can be configured to emit light having different distinguishing characteristics. For example, the one or more illuminators 30 can be configured to emit a first light 52 and a second light 54. The one or more illuminators 30 can be a single illuminator configured to emit the first light 52 and the second light 54. The one or more illuminators 30 can be a first illuminator configured to emit the first light 52 and a second illuminator configured to emit the second light 54. The one or more illuminators 30 can be configured to emit a third, fourth, fifth, sixth, seventh, eighth, or up to nth light.

Turning back to the selective reflector 48, if the first light 52 and second light 54 have different distinguishing characteristics, then the selective reflector 48 can be configured to selectively transmit the first light 52 and selectively reflect the second light 54. If the first light 52 travels down the first optical path 24, then it is transmitted through the selective reflector 48 and impinges on the image sensor 22. If the first light 52 travels down the second optical path 26, then it is similarly transmitted through the selective reflector 48, but because of the orientation of the second optical path 26, it is does not impinge on the image sensor 22.

In certain aspects, the first light 52, the second light 54, or other light described herein can have a wavelength that is in the ultraviolet portion of the spectrum (100 nm to 400 nm), the visible portion of the spectrum (400 nm to 750 nm), or the near-infrared portion of the spectrum (750 nm to 2500 nm). It should be appreciated that these definitions are approximations and that the boundaries between the various definitions can vary. Unless specified to the contrary, the definitions of the various portions of the spectrum set forth herein are controlling.

In certain aspects, the first light 52 can have a different wavelength than the second light 54. In aspects having more than two lights, the third light can have a different wavelength than the first light 52 and the second light 54. The fourth light can have a different wavelength than the first light 52, the second light 54, and the third light. Each subsequent light can have a different light than the preceding lights, up to an nth light that has a different wavelength than the first light 52, the second light 54, the third, fourth . . . , and (n–1)th light.

In certain aspects, the first light 52 can have a different polarization than the second light 54. In certain aspects, the first light 52 can have linear polarization and the second light 54 can have crossed linear polarization. In certain aspects, the first light 52 can have a circular or elliptical polarization of one handedness and the second light 54 can have a circular or elliptical polarization of the opposite handedness.

In certain aspects, the first light 52 can have a different wavelength and a different polarization than the second light 54. The combined differences in wavelength and polarization in these aspects can be the same as the differences set forth above in the descriptions of the differences in wavelength and polarization.

The vision system 20 can include various additional optics 56 that are known to be useful in the image acquisition arts. In certain cases, the additional optics 56 are those that can be useful to improve the separation of the first light and the second light. In certain cases, the additional optics 56 are those that can be useful to improving the quality of image acquisition. Examples of additional optics 56 suitable for use with the present disclosure include, but are not limited to, lenses, filters, apertures, shutters, polarizers, additional mirrors, waveplates, prisms, combinations thereof, and the like. A person having ordinary skill in the art can appreciate that the number of possible combinations of additional optics 56 and their possible placements is very large, and the specific options described herein should not be interpreted as limiting.

One particular aspect involving additional optics 56 involves the use of lenses. A person having ordinary skill in the vision system arts will appreciate that deploying lenses having the same/similar properties or different properties independently within different optical paths can vary the different fields of view and focal planes that result, and will also appreciate that the way that the optical paths are arranged can also impact the resulting fields of view and focal planes. For example, the arrangement illustrated in FIG. 1 having two different fields of view and focal planes can be provided by using different lenses in the two optical paths.

In certain aspects, the vision system 20 can include a first lens that defines the first field of view 32 and the first focal plane 34 and a second lens that defines the second field of view 36 and the second focal plane 38.

Another particular aspect involving additional optics 56 involves the use of filters. A person having ordinary skill in the art will appreciate that deploying filters having different properties independently within different optical paths can vary the selective transmission properties of those different optical paths relative to one another. For example, one optical path could have a high pass filter that allows colors having a wavelength shorter than ~600 nm to pass while another optical path could have a low pass filter that allows colors having a wavelength longer than ~600 nm to pass, thereby providing enhanced color selectivity. A person having ordinary skill in the art will also appreciate that deploying various neutral density filter can control the brightness of light reaching the image sensor 22, and will appreciate how to deploy such neutral density filters to improve image quality. Examples of filters that are suitable for use with the present disclosure include, but are not limited to, high pass filters, low pass filters, narrow band filters, neutral density filters, polarization filters, and the like.

In certain aspects, the vision system 20 can include a first filter positioned in the first optical path 24 and configured to selectively transmit the first light 52 over the second light 54. In certain aspects, the vision system 20 can include a second filter positioned in the second optical path 26 and configured to selectively transmit the second light 54 over the first light 52.

In certain aspects, the vision system 20 can include a third, fourth, fifth, sixth, seventh, eighth, or up to nth optical path, each having a distinct field of view and/or a distinct focal plane. Each of the up to nth optical paths can be selectively transmissive to a particular light over light that is selective transmitted by each of the other optical paths. Each of the up to nth fields of view can overlap or not overlap, as discussed above with respect to the first field of view 32 and the second field of view 36. Each of the up to nth focal planes can be the same or different relative to one another, as discussed above with respect to the first focal plane 34 and the second focal plane 38. The vision system 20 can include an up to nth In certain aspects, the vision system 20 can include various features that are useful for acquiring images. The vision system 20 can include a zoom system by which the focal plane of any of the optical paths described herein can be adjusted. The vision system 20 can include a manual focus system by which the focus of any of the optical paths described herein can be manually adjusted. The vision system 20 can include an autofocus system by which the focus of any of the optical paths described herein can be automatically adjusted.

Figure 7:
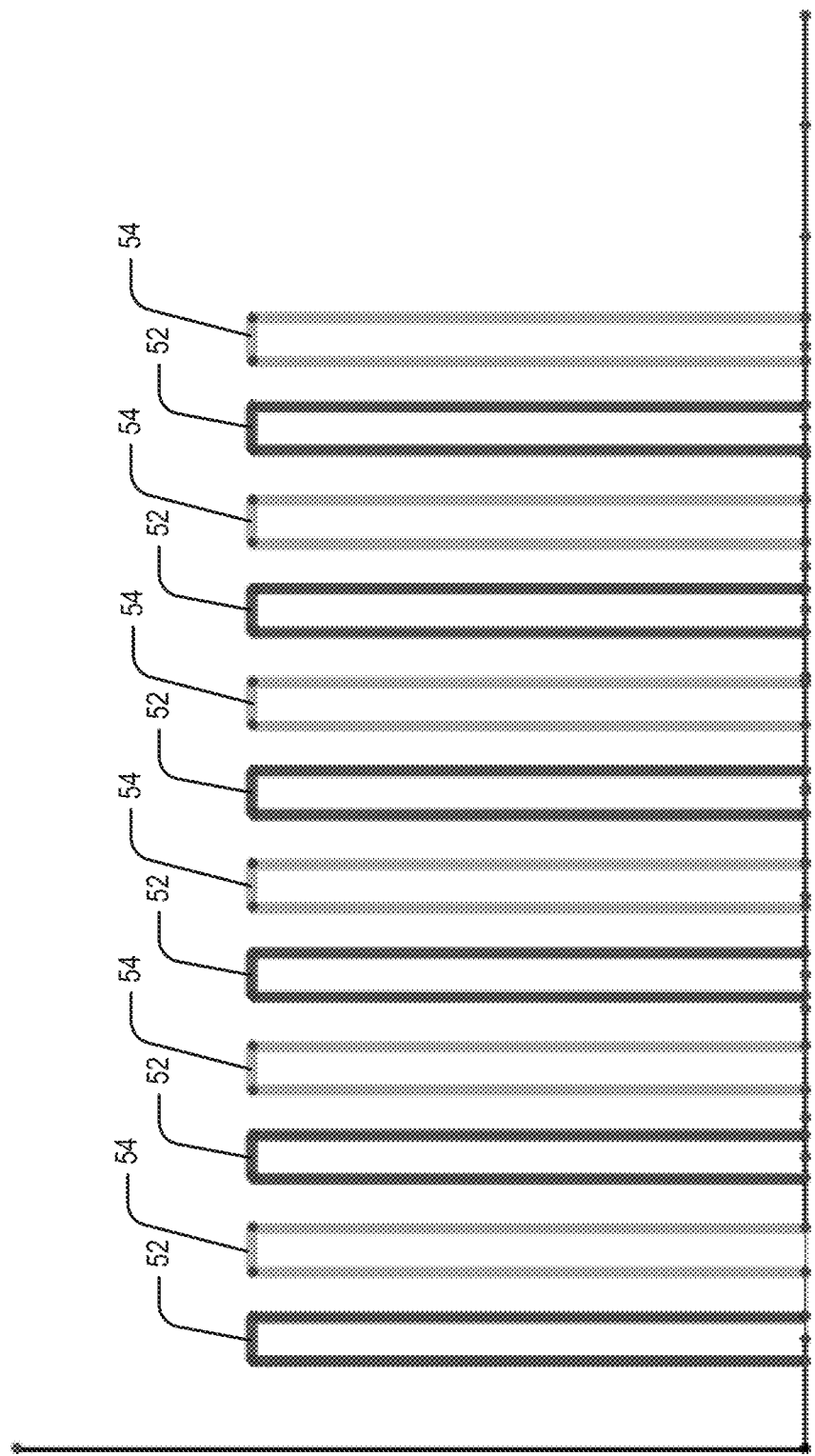
FIG. 7 is a plot of an exemplary illumination sequence, in accordance with the present disclosure.

Referring to FIG. 7, an exemplary illumination sequence is illustrated, where the y-axis is illumination intensity and the x-axis is time. The illustrated sequence alternates illumination between illuminating with the first light 52 and the second light 54. It should be appreciated that a wide variety of possible illumination sequences and illumination pulse profiles can be used with the present disclosure, and the sequence shown in FIG. 7 is only one potential sequence. A person having ordinary skill in the optical arts will appreciate that various parameters, such as pulse shape, pulse width, pulse repetition rate, pulse intensity profile, and the like, can be manipulated to change the performance characteristics of the vision system 20 in ways that can be predicted by a person having ordinary skill in the optical arts.

Figure 8:
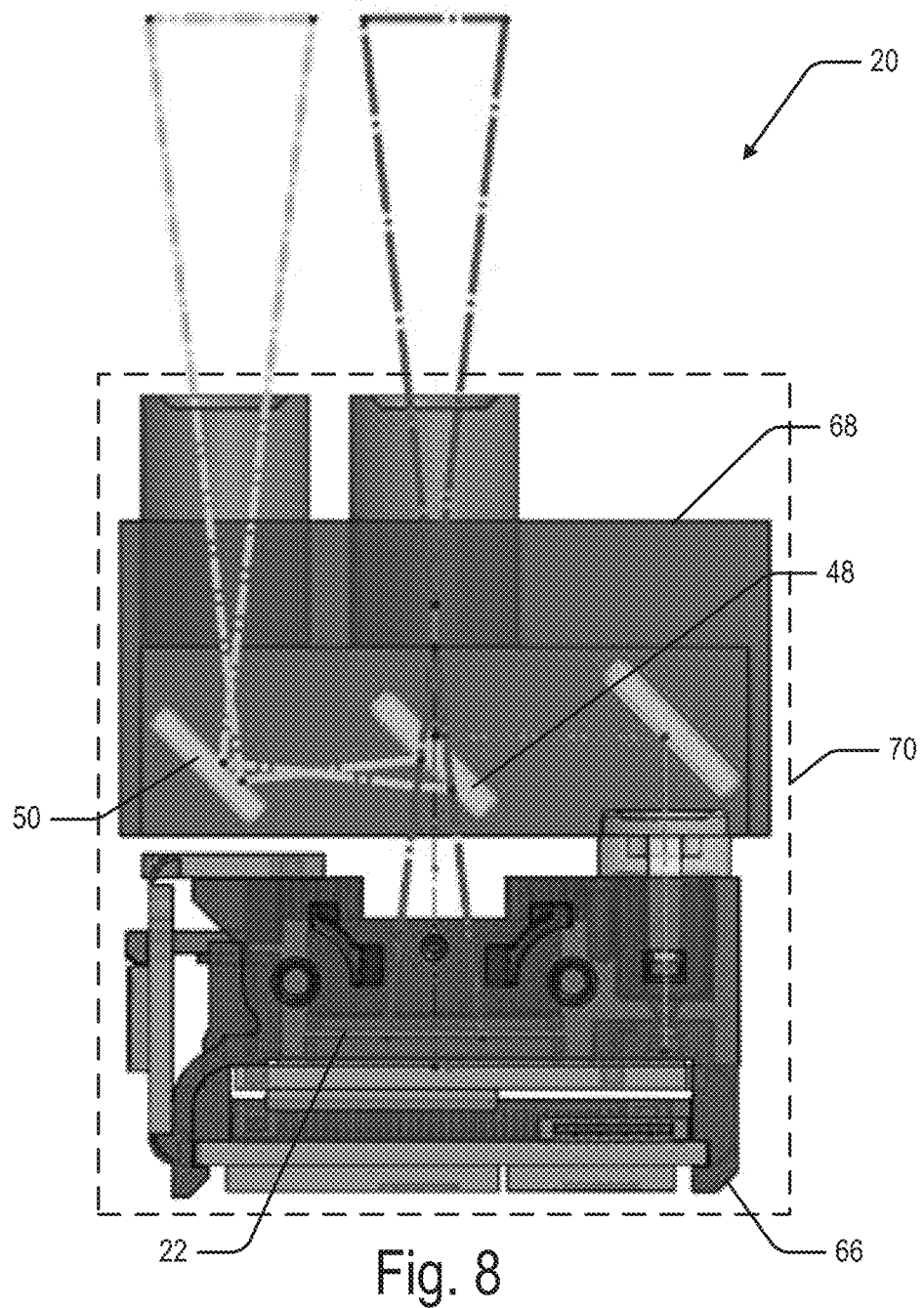
FIG. 8 is a cross-section view of a vision system showing various aspects of housings configured to house the components of the vision system.

Referring to FIG. 8, one example of a vision system 20 having a camera housing is illustrated. The features identified in and described with respect to FIG. 8 are combinable with other features described elsewhere.

In an aspect, the vision system 20 can include a core housing 66 configured to house the image sensor 22 and any electronic components that are necessary to have on-board with the image sensor 22 for the function of the vision system 20. One example of a core housing 66 is a traditional camera housing with a lens objective removed. The core housing 66 can optionally house the one or more illuminators 30.

In an aspect, the vision system 20 can include an optical component housing 68 configured to house one or more selective reflectors 48, one or more second reflectors 50, and additional optics 56 including lens assemblies and other additional optics 56 described elsewhere herein.

The core housing 66 and the optical component housing 68 can a formed of a single, monolithic piece or can be component parts that can selectively attach to one another via attachment mechanisms known to those having ordinary skill in the art (for example, snapping together, screwing together in a fashion similar to how a lens screws onto a camera, magnetic attachment, and the like).

In an aspect, the vision system 20 can include an outer housing 70 configured to house all or substantially all of the other components of the vision system 20. The outer housing 70 can be configured to encompass the core housing 66 and the optical component housing 68. In certain aspects, the outer housing 70 can be configured to serve the same function as described above with respect to the core housing 66 and the optical component housing 68. The outer housing 70, the core housing 66, and the optical component housing 68 can be formed of a single, monolithic piece or can be component parts that selectively attach to one another via attachment mechanisms known to those having ordinary skill in the art.

Features of the methods 200, 300, 400 described herein are applicable to the vision system 20.

Method of Acquiring an Image of an Image Scene

Figure 9:
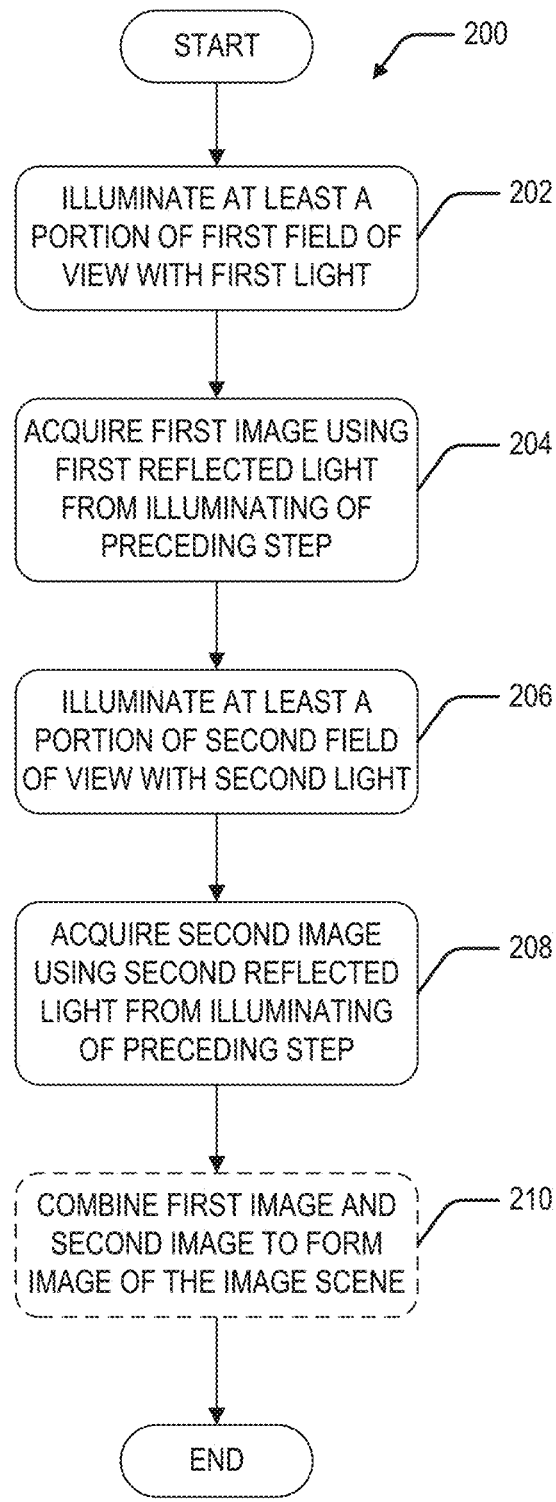
FIG. 9 is a flowchart illustrating a method, in accordance with the present disclosure.

Referring to FIG. 9, this disclosure provides a method 200 of acquiring one or more images of an image scene. At process block 202, the method 200 can include illuminating at least a portion of a first field of view 32 of a first optical path 24 with a first light 52. The first field of view 32 can overlap at least partially with the image scene. The first optical path 24 can project the first field of view 32 onto an image sensor 22. The first optical path 24 can be selectively transmissive of the first light 52 over the second light 54. At process block 204, the method 200 can include acquiring a first image using a first reflected light from the illuminating of process block 202. The acquiring of process block 204 can be achieved using the image sensor 22 and the processor 28. At process block 206, the method 200 can include illuminating at least a portion of a second field of view 36 of a second optical path 26 with the second light 54. The second field of view 36 can overlap at least partially with the image scene. The second optical path 26 can project the second field of view 36 onto the image sensor 22. The second optical path 26 can be selectively transmissive of the second light 54 over the first light 52. At process block 208, the method 200 can include acquiring a second image using a second reflected light from the illuminating of process block 206. The acquiring of process block 204 can be achieved using the image sensor 22 and the processor 28. At optional process block 210, the method 200 can optionally include combining the first image and the second image to form a single image including at least a portion of the image scene. The combining can be performed by the processor 28.

In certain aspects, the steps of the method 200 can be executed sequentially.

In certain aspects, the illuminating of process block 202 and the illuminating of process block 206 can occur at the same time. In certain aspects, the illuminating of process block 202 and the illuminating of process block 206 can occur at different times. In certain aspects, the illuminating of process block 202 and the illuminating of process block 206 can overlap partially in time.

In certain aspects, the illuminating of process block 202 and the illuminating of process block 206 can be separated by a length of time of between 1 µs and 1 s, including but not limited to, a length of time of between 10 µs and 100 ms, between 100 µs and 10 ms, between 1 ms and 50 ms, between 50 µs and 100 µs, between 5 µs and 50 µs, and combinations of the lower and upper bounds not explicitly set forth. The length of time separating pulses can be measured in two different ways: 1) the time between the end of one pulse and the beginning of another; and 2) the time between two like portions of two pulses (i.e., the time between the start of two pulses, the time between the mid-point of two pulses, the time between the end of two pulses, etc.).

In certain aspects, the illuminating of process block 202, the illuminating of process block 206, or both can include flashes of light having a pulse length of between 1 ns and 1 ms, including but not limited to, a pulse length between 10 ns and 100 µs, between 100 ns and 10 µs, between 1 µs and 5 µs, between 5 µs and 10 µs, between 50 µs and 100 µs, between 50 ns and 100 ns, between 5 ns and 10 ns, and combinations of the lower and upper bounds not explicitly set forth.

In certain aspects, the method 200 can include filtering the first optical path 24 to remove the second light 54 and/or filtering the second optical path 26 to remove the first light 52.

Features of the vision system 20 and other methods 300, 400 described herein are applicable to the method 200 of acquiring an image of an image scene.

Method of Measuring a Position of an Object in a Three-Dimensional Space

Figure 10:
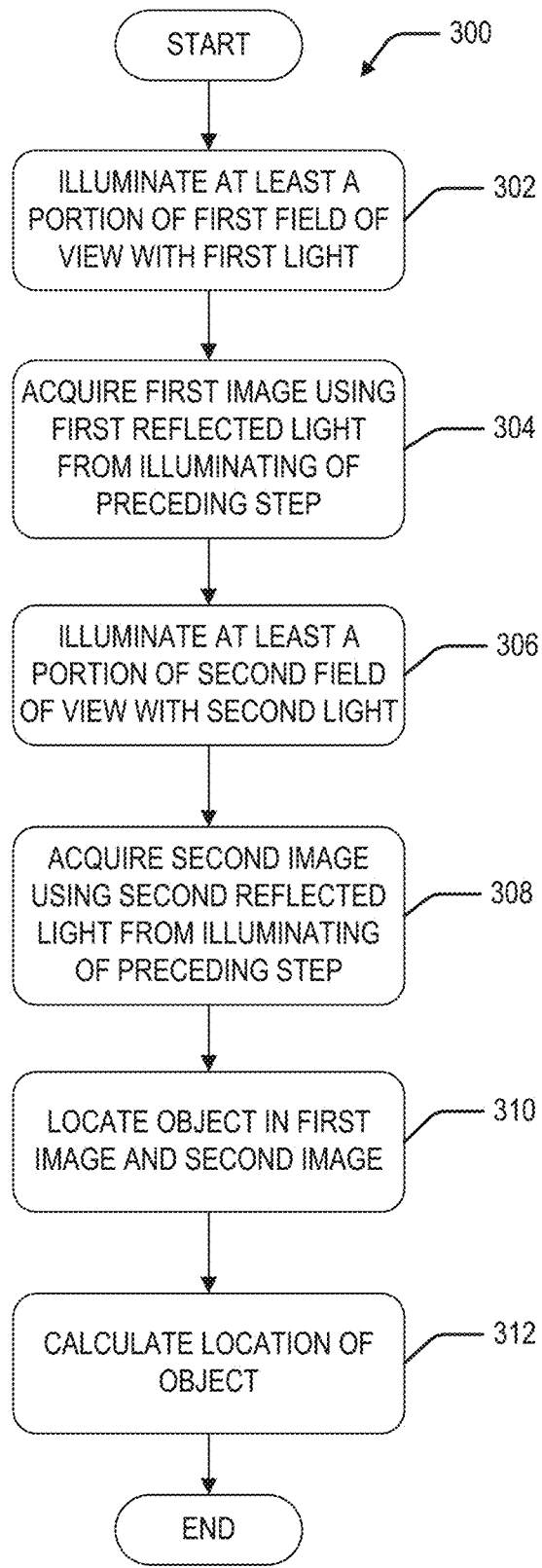
FIG. 10 is a flowchart illustrating a method, in accordance with the present disclosure.
Figure 11:
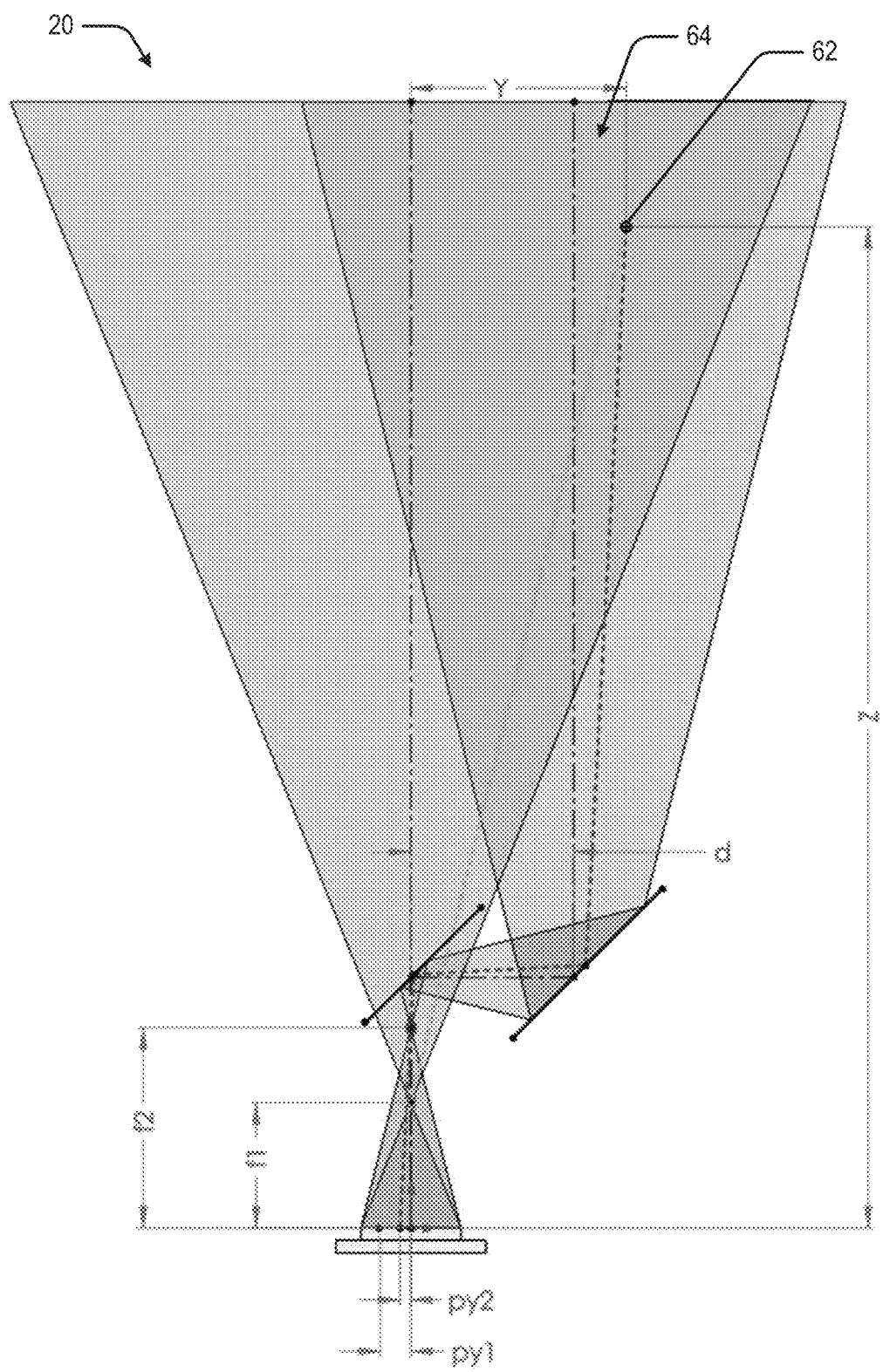
FIG. 11 is a cross-section view of a vision system, illustrating some of the measurements used in a method of measuring a position of an object in a three-dimensional space, in accordance with the present disclosure.
Figure 12:
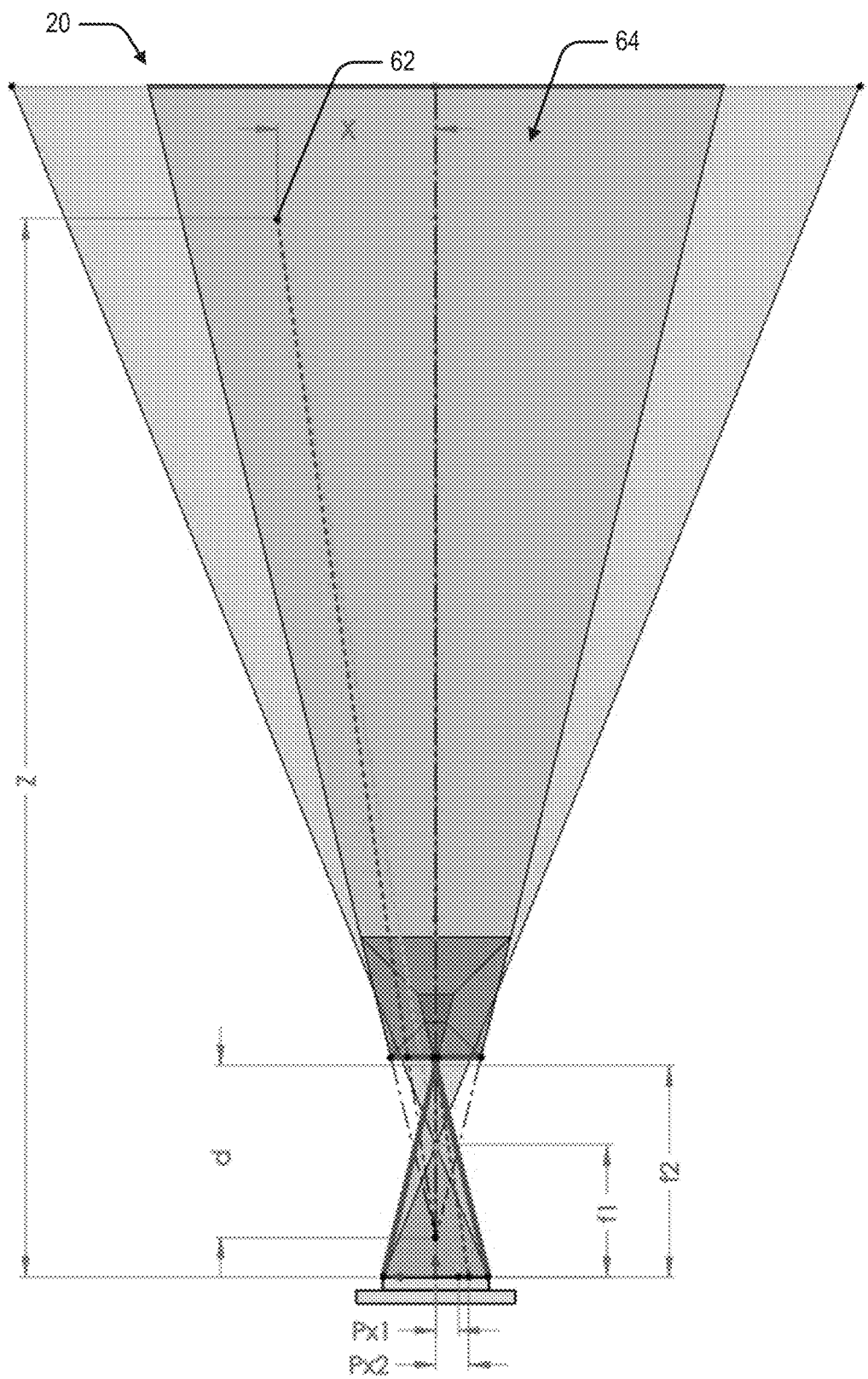
FIG. 12 is a cross-section view of a vision system at a 90° angle relative to the cross-section of FIG. 11, illustrating some of the measurements used in a method of measuring a position of an object in a three-dimensional space, in accordance with the present disclosure.

Referring to FIG. 10, this disclosure also provides a method 300 of measuring a position of an object in a three-dimensional space. Referring to FIGS. 11 and 12, the object 62 can be located in the overlapping field of view 60. Other aspects of the vision system 20 of FIGS. 11 and 12 are the same as those identified in FIGS. 3-5.

The method 300 can involve measuring the position of the object in the three-dimensional space, where the three-dimensional space is defined by an overlap of a first field of view and a second field of view. The method 300 can utilize a camera system, one or more illuminators, and a processor. The camera system can include a first image sensor. The first image sensor can define a z-direction that is normal to the first image sensor, a y-direction that lies in a plane of the first image sensor, and an x-direction that lies in the plane of the first image sensor at a 90° angle relative to the y-direction.

The first optical path can have a first field of view and the second optical path can have a second field of view. The first optical path can be selectively transmissive of a first light over a second light. The second optical path can be selectively transmissive of the second light over the first light.

At process block 302, the method 300 can include illuminating, using the one or more illuminators, at least a portion of the first field of view with the first light. At process block 304, the method 300 can include acquiring, using the first image sensor and the processor, a first image of at least a portion of the three-dimensional space using a first reflected light from the illuminating of process block 302. At process block 306, the method 300 can include illuminating, using the one or more illuminators, at least a portion of the second field of view with the second light. At process block 308, the method 300 can include acquiring, using the first image sensor and the processor, a second image of at least a portion of the three-dimensional space using a second reflected light from the illuminating of process block 306. At process block 310, the method 300 can include locating the object in the first image and the second image. At process block 312, the method 300 can include calculating, using one or more geometric functions executed by the processor, the location of the object in the first image, the location of the object in the second image, the focal length of the first optical path, the focal length of the second optical path, and an offset distance between the first optical path and the second optical path in the y-direction, the location of the object in the three-dimensional space.

The object can be a complete object or a portion of an object, such as a corner of an object, a point located on an object, a character printed or otherwise positions on an object, and the like. It should be appreciated that the method 300 can be repeated for multiple parts of an object in order to map the location, position, and/or orientation of the entire object. For example, a cube could have the location of multiple corner points determined and the location, position, and orientation of the cube could be determined by computational methods known to those having ordinary skill in the art.

The calculating of process block 312 can utilize geometric equations known to those having ordinary skill in the art to be suitable for solving the relevant spatial relationships. The following description is of one potential set of geometric equations and is not intended to be limiting. The following equations relate to the lenses and/or apertures of the first optical path and the second optical path and relate either the x-direction or y-direction to the z-direction:

$$Z = f1 \cdot \left(1 + \frac{X}{px1}\right) \quad (1)$$

$$Z = f2 + f2 \cdot \frac{X}{px2} - d \quad (2)$$

$$Z = f1 \cdot \left(1 + \frac{Y}{py1}\right) \quad (3)$$

$$Z = f2 + f2 \cdot \frac{(Y-d)}{py2} - d \quad (4)$$

where px1 is an x-component of the location of the object in the first image relative to a center point of the first image sensor, py1 is a y-component of the location of the object in the first image relative to the center point of the first image sensor, px2 is an x-component of the location of the object in the second image relative to the center point of the first image sensor, py2 is a y-component of the location of the object in the second image relative to the center point of the first image sensor, f1 is the focal length of the first optical path, f2 is the focal length of the second optical path, d is the offset distance between the first optical path and the second optical path, Z is a distance of the object relative to the center of the first image sensor in the z-direction, Y is a distance of the object relative to the center of the first image sensor in the y-direction, and X is a distance of the object relative to the center of the first image sensor in the x-direction.

Equations (1)-(4) provide a system of four equations and three unknown parameters (X, Y, and Z). Solving the equations for these unknown parameters provides the following three equations:

$$X = \frac{(f2 - f1 - d) \cdot px1 \cdot px2}{f1 \cdot px2 - f2 \cdot px1} \quad (5)$$

$$Y = \frac{(f2 - f1 - d) \cdot py1 \cdot px2}{f1 \cdot px2 - f2 \cdot px1} \quad (6)$$

$$Z = f1 \cdot \left(\frac{f2 \cdot (px2 - px1) - d \cdot px2}{f1 \cdot px2 - f2 \cdot px1}\right). \quad (7)$$

Solving equations (5)-(7) provides the coordinates of the object relative to the first image sensor. The inputs to equations (5)-(7) can be known or acquired/measured by the methods described herein.

It bears repeating that these equations are not the exclusive way to calculate the location of an object according to the method 300. A person having ordinary skill in the art will appreciate that many mathematical representations can be used in their place and presenting this exemplary set of equations is not intended to be limiting.

Features of the vision system 20 and other methods 200, 400 described herein are applicable to the method 300 of measuring a position of an object in a three-dimensional space.

Method of Making a Vision System

Figure 13:
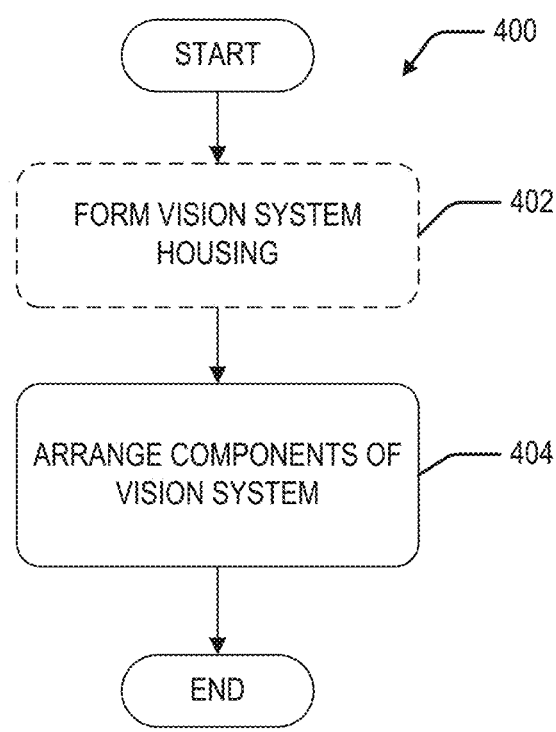
FIG. 13 is a flowchart illustrating a method, in accordance with the present disclosure.

Referring to FIG. 13, this disclosure further provides a method 400 of making a vision system 20. At optional process block 402, the method 400 can optionally include forming a vision system housing. In certain aspects, this forming can involve injection molding. This forming can further involve forming a housing having mounting locations for the various components described elsewhere herein. At process block 402, the method 400 can involve arranging the various components of the vision system 20 described elsewhere herein in the fashion necessary to provide the performance characteristics described elsewhere herein. In certain aspects, the arranging can involve arranging the components within the vision system housing.

Features of the vision system 20 and other methods 200, 300 described herein are applicable to the method 400 of making a vision system 20.

Although the present technology has been described with reference to preferred aspects, workers skilled in the art will recognize that changes may be made in form and detail without departing from the spirit and scope of the technology.

The particular aspects disclosed above are illustrative only, as the technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular aspects disclosed above may be altered or modified and all such variations are considered within the scope and spirit of the technology. Accordingly, the protection sought herein is as set forth in the claims below.

What is claimed is:

1. A vision system comprising:
   a first image sensor;
   a first optical path having a first lens, a first field of view, and a first focal plane, the first optical path projecting a first image scene from the first field of view onto the first image sensor;
   a second optical path having a second lens that is different than the first lens, a second field of view, and a second focal plane, the second optical path projecting a second image scene from the second field of view onto the first image sensor;
   one or more illuminators configured to selectively illuminate at least a portion of the first field of view with a first light and at least a portion of the second field of view with a second light; and
   a processor electronically coupled to the first image sensor and configured to receive and process image data from the first image sensor, the processor electronically coupled to the one or more illuminators and configured to control the one or more illuminators,
   wherein the first light has a first distinguishing characteristic that is different than a second distinguishing characteristic of the second light,
   wherein the first optical path selectively transmits the first light over the second light and the second optical path selectively transmits the second light over the first light,
   wherein the first and second distinguishing characteristics are wavelength, polarization, or a combination thereof,
   wherein the first and second fields of view are different.

2. The vision system of claim 1, wherein the first field of view is different than the second field of view, the first focal plane is different than the second focal plane, or a combination thereof.

3. The vision system of claim 1, wherein the first optical path comprises a first aperture and the second optical path comprises a second aperture, the first aperture and the second aperture having a different size and/or shape.

4. The vision system of claim 1, wherein the first and second distinguishing characteristics are wavelength.

5. The vision system of claim 1, wherein the first light has a first wavelength and the second light has a second wavelength, wherein the first wavelength is greater than a pre-defined differentiating wavelength and the second wavelength is less than the pre-defined differentiating wavelength.

6. The vision system of claim 1, wherein the first optical path or the second optical path includes a selective reflector that selectively reflects the first light over the second light or the second light over the first light.

7. The vision system of claim 1, the vision system further comprising a first filter positioned in the first optical path and a second filter positioned in the second optical path, the first filter transmits the first light and blocks the second light, the second filter transmits the second light and blocks the first light.

8. The vision system of claim 1, wherein the first optical path has a first co-axial portion adjacent to the first image sensor and a first distal portion distal from the first image sensor, the second optical path has a second co-axial portion adjacent to the first image sensor and a second distal portion distal from the first image sensor, wherein the first co-axial portion and the second co-axial portion are co-axial, and wherein the first distal portion and the second distal portion are not co-axial.

9. The vision system of claim 8, the vision system further comprising a selective reflector, the selective reflector configured to receive the second light from the second distal portion and to reflect the second light to the second co-axial portion and to receive the first light from the first distal portion, the selective reflector positioned between the first distal portion and the first co-axial portion and configured to reflect the second light from the first distal portion away from the first co-axial portion, the selective reflector configured to transmit the first light.

10. The vision system of claim 1, the vision system further comprising a handheld housing containing the first image sensor, a portion of the first optical path, a portion of the second optical path, and the one or more illuminators.

11. The vision system of claim 1, the vision system further comprising a third optical path having a third field of view and a third focal plane, the third optical path projecting a third image scene from the third field of view onto the first image sensor, the one or more illuminators configured to selectively illuminate at least a portion of the third field of view with a third light,
   wherein the third light has at least one third distinguishing characteristic that is different than the first distinguishing characteristic and the second distinguishing characteristic,
   wherein the first optical path selectively transmits the first light over the third light,
   wherein the second optical path selectively transmits the second light over the third light, and
   wherein the third optical path selectively transmits the third light over the first light and the second light;
   wherein the first, second, and third distinguishing characteristics are wavelength.

12. The vision system of claim 1, wherein the first image sensor is a color image sensor.

13. The vision system of claim 12, wherein the processor and the color image sensor are configured to simultaneously acquire images of the first image scene and the second image scene.

14. A method of acquiring one or more images of an image scene, the method comprising:
   a) illuminating at least a portion of a first field of view of a first optical path having a first lens, with a first light, the first field of view overlapping at least partially with the image scene, the first optical path projects the first field of view onto a first image sensor, the first optical path is selectively transmissive of the first light having a first distinguishing characteristic over a second light having a second distinguishing characteristic, wherein the first and second distinguishing characteristics are wavelength;

b) acquiring, using the first image sensor and a processor, a first image using a first reflected light from the illuminating of step a);

c) illuminating at least a portion of a second field of view of a second optical path having a second lens, with the second light, the second field of view overlapping at least partially with the image scene, the second optical path projects the second field of view onto the first image sensor, the second optical path is selectively transmissive of the second light having the second distinguishing characteristic over the first light having the first distinguishing characteristic; and d) acquiring, using the first image sensor and the processor, a second image using a second reflected light from the illuminating of step c), wherein the first and second fields of view of different.

15. The method of claim 14, the method further comprising:

e) combining, using the processor, the first image and the second image to form a single image including at least a portion of the image scene.

16. The method of claim 14, wherein the illuminating of step a) and the illuminating of step c) do not overlap in time.

17. The method of claim 16, wherein the illuminating of step a) and the illuminating of step b) are separated by between 1 μs and 1 s.

18. The method of claim 14, wherein the illuminating of step a), the illuminating of step c), or both include flashes of light having a pulse length of between 1 μs and 1 s.

19. A method of measuring a position of an object in a three-dimensional space defined by an overlap of a first field of view and a second field of view, the method utilizing a camera system comprising a first image sensor, a first optical path, a second optical path, one or more illuminators, and a processor, the first image sensor defining a z-direction that is normal to the first image sensor, a y-direction that lies in a plane of the first image sensor, and an x-direction that lies in the plane of the first image sensor at a 90° angle relative to the y-direction, the first optical path having the first field of view, the second optical path having the second field of view, the method comprising:

a) illuminating, using the one or more illuminators, at least a portion of the first field of view with a first light, the first optical path is selectively transmissive of the first light over a second light;

b) acquiring, using the first image sensor and the processor, a first image of at least a portion of the three-dimensional space using a first reflected light from the illuminating of step a);

c) illuminating, using the one or more illuminators, at least a portion of the second field of view with the second light, the second optical path is selectively transmissive of the second light over the first light;

d) acquiring, using the first image sensor and the processor, a second image of at least at portion of the three-dimensional space using a second reflected light from the illuminating of step c);

e) locating the object in the first image and the second image; and f) calculating, using one or more geometric functions executed by the processor, the location of the object in the first image, the location of the object in the second image, the focal length of the first optical path, the focal length of the second optical path, and an offset distance between the first optical path and the second optical path in the y-direction, the location of the object in the three-dimensional space.

20. The method of claim 19, wherein the geometric functions include:

$$X = \frac{(f2 - f1 - d) \cdot px1 \cdot px2}{f1 \cdot px2 - f2 \cdot px1};$$

$$Y = \frac{(f2 - f1 - d) \cdot py1 \cdot px2}{f1 \cdot px2 - f2 \cdot px1};$$

and $$Z = f1 \cdot \left( \frac{f2 \cdot (px2 - px1) - d \cdot px2}{f1 \cdot px2 - f2 \cdot px1} \right),$$

wherein px1 is an x-component of the location of the object in the first image relative to a center point of the first image sensor, py1 is a y-component of the location of the object in the first image relative to the center point of the first image sensor, px2 is an x-component of the location of the object in the second image relative to the center point of the first image sensor, f1 is the focal length of the first optical path, f2 is the focal length of the second optical path, d is the offset distance between the first optical path and the second optical path, Z is a distance of the object relative to the center of the first image sensor in the z-direction, Y is a distance of the object relative to the center of the first image sensor in the y-direction, and X is a distance of the object relative to the center of the first image sensor in the x-direction.

* * * * *